Figure 1:
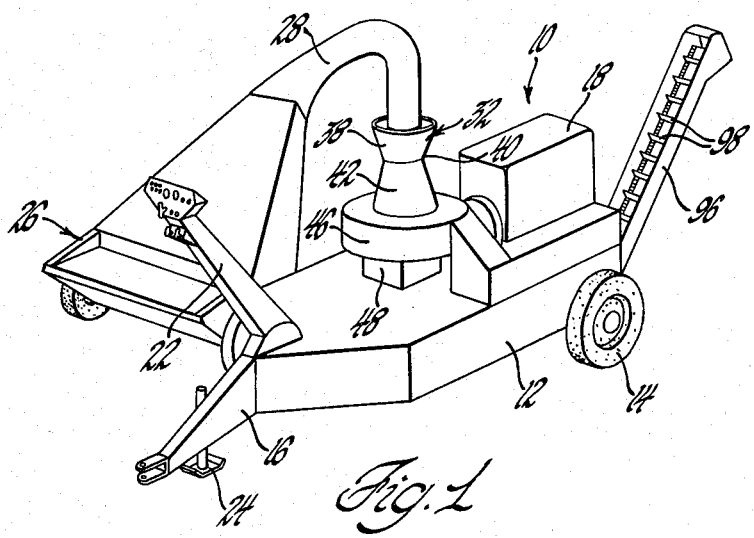

May 18, 1965   S. L. LAWRENCE   3,183,857
HAY WAFERING METHOD AND APPARATUS
Filed Aug. 23, 1962

INVENTOR.
Stanley L. Lawrence
BY
Barnard & McGlynn
ATTORNEYS 3,183,857
HAY WAFERING METHOD AND APPARATUS
Stanley L. Lawrence, Livonia, Mich., assignor to Massey-Ferguson Inc., Detroit, Mich., a corporation of Maryland
Filed Aug. 23, 1962, Ser. No. 218,963
9 Claims. (Cl. 107—14)

This invention relates to a method and apparatus for producing hay wafers and, in particular, to a method and apparatus for field wafering forage crops into hay wafers which is particularly characterized by an improved method of and means for feeding hay to the wafering apparatus.

In recent times, apparatus have been devised for field wafering forage crops into hay wafers comprising an annular series of axially open die cells including entrance ends thereof circumferentially spaced about and communicating with a wafering chamber in which there is mounted a rotary hay compaction or compression means for compacting or compressing hay received within the wafering chamber into and through the die cells to form hay wafers. A rotatable multiple flight feed auger has been disposed within an enclosing hopper having one end thereof communicating with the aforementioned chamber. A pick-up mechanism, such as of the rotary flail type including a plurality of spaced rapidly rotatable flails or arms, has been provided for picking up and delivering hay, preferably preconditioned or processed, finely chopped, mixed and blended hay from a windrow within a field, to the aforementioned hopper for feed therefrom to the wafering chamber. As a result, as such an apparatus moves through a field of mown hay, the latter is continuously picked up and delivered to the aforementioned hopper from which it is fed by the multiple flight feed auger to the wafering chamber and the rotary hay compaction or compression means aforementioned to provide a continuous extrusion of compressed or compacted hay of substantially uniform quality, constituency, shape and density emerging from the exit ends of the respective die cells, and each extrusion is adapted to be engaged within an ejection means adjacent the exit end of each of the die cells to break the respective extrusions of hay into hay wafers of substantially uniform length, which then preferably fall upon a conveyor means for removal from the apparatus.

In an apparatus of the type aforementioned, the hay mixture picked up and delivered by the aforementioned pick-up mechanism is entrained in or accompanied by an air stream traveling at considerable velocity due to the action of the rapidly rotating flails or arms of the pick-up mechanism. It has been found that, if this air stream or at least a substantial portion thereof is not separated from the hay being delivered to the hopper, a back pressure will build up in the latter retarding to a substantial extent further continuous supply of hay thereto by the rotary flail pick-up mechanism or the like. As a consequence, relatively elaborate arrangements have been made heretofore to separate the air stream from the hay prior to its delivery to the hopper.

For example, means have been provided in connection with the delivery chute associated with a rotary flail type of pick-up mechanism for separating the air stream from the hay propelled through the delivery chute and diverting or venting the air stream from the delivery chute. In other instances, often in combination with the venting arrangement aforementioned, various vent openings have been provided in other portions of the apparatus and even in a side wall of the hopper alongside the feed auger therein which, of course, is not too satisfactory since hay may be lost therethrough either while delivering hay to the hopper or during the feeding action therefrom under the influence of the feed auger, or both.

In addition, in prior apparatus of the type aforementioned, the delivery chute of the pick-up mechanism has been connected to the hopper to one side thereof and of the axis of rotation of the multiple flight feed auger contained therein. Thus, the respective flights of the feed auger alternately or successively rotate into and through the area of the hopper receiving the hay and pick up the latter for feed to the wafering chamber. Hence, the delivered hay may be unequally distributed to the respective flights of the auger and, through the feeding action of the latter, unequally distributed to respective ones or groups of the annular series of die cells communicating with the wafering chamber. This is particularly true when, for one reason or another, hay is being delivered to the hopper at rates or in quantities less than that for which the apparatus was designed resulting in a particular group or, in any event, less than all of the individual die cells of the annular series thereof being fed more hay from the auger and more wafers formed therefrom than from other die cells. As will readily be apparent, such a condition results in overworking certain ones of the die cells resulting in inordinate wear thereof and a decrease in the production rate of wafers and the overall efficiency of the apparatus.

The present invention contemplates an improved method and apparatus for making compressed hay wafers and of the general type aforementioned having an annular series of axially open die cells including entrance ends thereof circumferentially spaced about and communicating with a wafering chamber in which there is mounted a rotary hay compaction or compression means for compacting or compressing hay received within the wafering chamber into and through the respective die cells to form wafers, and particularly characterized by a hopper having one end thereof communicates with the aforementioned wafering chamber, a multiple flight feed auger rotatably disposed within the hopper for feeding hay therefrom to the aforementioned wafering chamber, means for delivering hay to be wafered into the hopper, and means associated with the hopper for venting the latter and, hence, any air stream accompanying the hay delivered thereto without losing any of the hay.

More specifically in this regard, the hopper is particularly characterized in having an open end opposite the aforementioned end thereof communicating with the wafering chamber, and a pick-up mechanism is provided for picking up and delivering hay to be wafered in an accompany air stream to a delivery chute having a discharge end radially spaced within the aforementioned open end of the hopper to define therebetween an annular vent opening spaced from one end of the feed auger disposed in the hopper, whereby the hay delivered through the discharge end of the chute passes along the hopper to the feed auger while the air stream is separated from the hay and vented from the hopper to atmosphere through the aforementioned vent opening.

In another of its aspects, the invention is further characterized by the fact that hay propelled from the pick-up mechanism through a delivery chute to the hopper is delivered to the latter substantially axially upon one end of the feed auger opposite the wafering chamber. As a consequence, hay delivered to the hopper is relatively uniformly distributed upon the respective flights of the auger, and irrespective of variation in the rates or quantities of hay delivered to the hopper. In this regard, the invention is further characterized by the fact that the feed auger includes a plurality of auger flights which are axially tapered outwardly from the one end thereof aforementioned receiving the hay from the delivery chute to the end thereof feeding the wafering chamber, whereby hay delivered axially thereto and passing a portion of an auger flight adjacent the receiving end thereof may fall up another auger flight portion spaced therefrom toward the wafering chamber.

Figure 2:
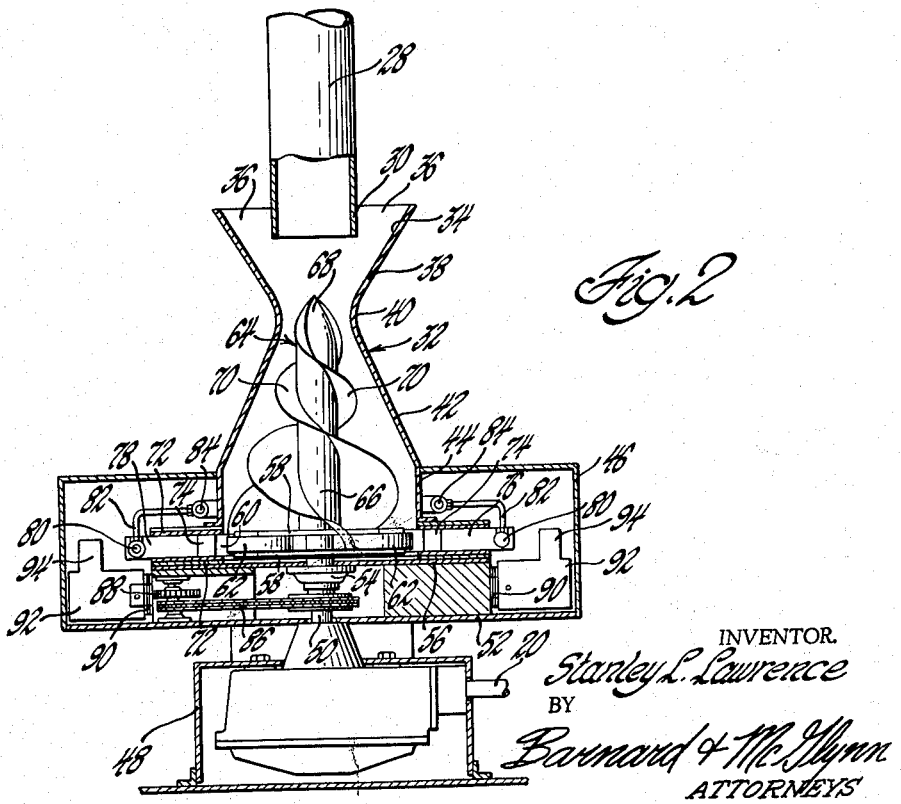

In order to facilitate an understanding of the invention, a preferred embodiment thereof will now be described with reference to the accompanying drawing in which:

FIGURE 1 is a perspective view of a hay wafering apparatus illustrating a preferred embodiment of the invention; and FIGURE 2 is an enlarged fragmentary vertical sectional view through the apparatus of FIGURE 1 illustrating certain details thereof.

Referring now to the drawing, the numeral 10 in FIGURE 1 generally indicates a hay wafering apparatus comprising a frame 12 equipped with the usual ground-engaging wheel means 14 in the usual manner and a drawbar 16 adapted to be hitched to a suitable prime mover, such as an agricultural tractor, for drawing the frame along a field of mown hay. A suitable engine 18 is mounted on the frame and includes an output shaft 20 connected in a manner to be described hereinafter to the rotary hay feeding and compaction or compression mechanism of the apparatus, as well as various other instrumentalities of the apparatus as desired. A control pedestal 22 is provided on the frame and mounts at the upper end thereof a control panel having instruments thereon for controlling the engine 18 and other instrumentalities of the apparatus. An adjustable foot 24 is provided as usual on the drawbar 16 to support the latter when the apparatus is not hitched to a towing prime mover.

The apparatus aforedescribed is adapted to be towed along a field of mown or cut hay, preferably with the hay arranged in windrows and having been preconditioned or processed in a known manner so as to consist of finely chopped, mixed and blended stem and leaf components froming a substantially homogeneous mass. As the apparatus is towed along a field, the hay in a given windrow is adapted to be picked up in a suitable pick-up mechanism preferably of the well know wheeled rotary flail type indicated generally at 26 and comprising a plurality of spaced rapidly rotatable flails or arms which pick up and direct the homogenized hay in an accompanying air stream moving at a relatively high velocity into the delivery chute 28, which delivers the hay and accompanying air stream through a cylindrical discharge end 30 thereof to the upper end of a vertically disposed hopper indicated generally at 32.

Referring now more particularly to FIGURE 2, it may be seen that the hopper 32 is substantially axially aligned with the discharge end 30 of the delivery chute and includes a circular upper open end 34 radially spaced from and surrounding the discharge end of the delivery chute to form an annular vent opening 36 therebetween. The hopper further includes an upper conical portion 38 tapering axially downwardly and inwardly from the upper open end 34 thereof to an annular intermediate throat portion 40, and a lower conical wall portion 42 tapering axially downwardly and outwardly from the throat portion to a cylindrical wall portion 44 suitably secured within an annular housing 46 suitably supported on frame 12.

As hay is delivered through the discharge end 30 of the delivery chute into the upper section of the hopper with its accompanying air stream, the heavier particles of hay separate from the air stream and continue to travel axially downwardly of the hopper to the throat portion 40 thereof, the tapered configuration of the upper section of the hopper serving to funnel any hay particles impinging thereon toward the throat portion. At the same time, the accompanying air stream is separated from the hay and vented to atmosphere through the annular vent opening 36, thereby preventing any pressure build-up within the hopper which might otherwise retard continuous delivery of hay thereto through the discharge end of the delivery chute.

The engine output shaft 20 is connected in any well known manner, as by gearing or the like disposed in housing 48 beneath the housing 46, to a vertically disposed drive shaft 50 which extends through the bottom wall 52 of the housing 46 to the interior of the latter, and is suitably rotatably supported therein by bearing means 54 mounted on a floor member 56 within the housing. A pair of spaced horizontal radially extending arms 58 have their central portions suitably rigidly secured to the drive shaft 50 for rotation therewith within the wafering chamber 60, and have journaled at the opposite ends thereof a pair of rotatable compaction or compression rollers 62 which travel in rotative paths within the wafering chamber immediately below the cylindrical wall portion 44 at the lower end of the lower section 42 of the hopper and above floor member 56.

A feed auger means is indicated generally at 64 and comprises a hub or shaft 66 having its lower end suitably rigidly secured for drive thereof to the drive shaft 54, projects upwardly therefrom substantially coaxially therewith and with the hopper 32 and includes a tapered upper end 68 disposed within and radially spaced from the annular throat portion 40 of the hopper. A suitable number of auger flights 70, in this case two corresponding to the number of rollers 62, are secured on the exterior surface of the hub or shaft 66 and have the lower ends thereof respectively terminating in the usual manner immediately in advance of the rotative path of travel of the respective rollers 62. As will be readily apparent from FIGURE 2, the respective flights of the feed auger means taper axially downwardly and outwardly from their upper ends at the upper end 68 of the hub or shaft 66 to their lower ends so as to be disposed adjacent but radially spaced from the lower tapered section 42 and cylindrical wall portion 44 of the hopper. For a more detailed description of such construction, reference may be made to copending application Serial No. 194,399, filed May 14, 1962 in the name of Merle H. Peterson and Stanley L. Lawrence, entitled "Hay Wafering Method and Apparatus," and assigned to the assignee of this application.

It will now be apparent that the hay supplied to the hopper 32 will be directed downwardly toward the throat portion 40 thereof as previously described, and will be delivered axially upon and about the upper end 68 of the auger hub or shaft 66 and the upper ends of the flights 70. To the extent that hay so delivered passes between upper portions of the auger flights 70 and the annular throat portion 40 of the hopper to the lower section 42 of the latter, the axially tapered configuration of the respective auger flights insure that a portion of each flight immediately below an upper portion thereof projects outwardly sufficiently from the latter as to receive some of the hay so delivered. As a consequence, hay is delivered substantially uniformly and with full feeding action to the respective auger flights, thereby contributing to optimum uniform distribution of hay to the feed auger means and supply therefrom to the wafering chamber 60.

The wafering chamber 60, the die cells associated therewith and through which the hay is adapted to be compacted or compressed by the rollers 62 to form extrusions of compacted hay emerging from the exit ends thereof, and the means for breaking wafers from such extrusions and conveying them from the apparatus may be constructed in any one of various known ways, one of which is illustrated in the drawing. Since the details of such construction do not, in and of themselves, form any part of the present invention and are known, a brief description of the nature and operation of these components of the apparatus should suffice for present purposes.

Thus, the wafering chamber 60 includes a pair of vertically spaced parallel annular die wall members 72 having fixedly disposed therebetween an annular or circumferentially spaced series of knife edges 74. An annular or circumferentially spaced series of pairs of side die wall members 76 and 78 are disposed between the die wall members 72, and have their radially inner ends suitably hingedly connected adjacent a radially outward portion of each of the respective fixed knife edges 74 so as to diverge radially outwardly therefrom in a V-shaped configuration. Thus, a series of axially open radially extending die cells are formed between the die wall members 72 and the respective oppositely spaced side die wall members 76 and 78 of an adjacent pair thereof as will be readily apparent to those acquainted with this art, and the axes of such die cells are contained in a common horizontal plane or a plane parallel with the ground with the entrance ends thereof communicating with the wafering chamber 60. The numeral 80 indicates conventional hydraulically operated motor assemblies of the type comprising relatively reciprocable piston and cylinder elements interposed between each hinged pair of side die wall members 76 and 78 to control their angular relationship relative to each other and, hence, the extent of convergence of the areas of the die cells between their entrance and exit ends, each of the motor assemblies being connected in the usual manner through a conduit 82 to a common annular manifold 84 connected to a source of fluid under pressure controlled from the control panel on the control pedestal 22.

As will be apparent, the rollers 62 are positioned closely to but do not engage the knife edges 74. Thus, hay fed continuously by the feed auger means 64 from the hopper 32 into the wafering chamber 60 is laid across the knife edges 74 and the entrance ends of the respective die cells in advance of the rotative path of the rollers 62, which rollers compact or compress the hay and force it past the knife edges and into and through the respective die cells upon successive rotative passes thereof.

A drive sprocket secured to the drive shaft 50 within the housing 46 is connected through a drive chain 86 to a similar sprocket mounted on a vertical shaft suitably rotatably mounted within the housing 46. A gear wheel 88 secured on the shaft engages an annular or circumferentially spaced series of drive pins 90 of an annular conveyor mechanism including a plurality of annularly or circumferentially spaced conveyor paddles 92. The conveyor paddles travel in a continuous path about the exit ends of the die cells and along the bottom wall 52 of the housing 46, and are disposed immediately below the horizontal plane of the die cells. A suitable number of spaced break-off tabs 94 each upstand from respective ones of the conveyor paddles 92 and project into the horizontal plane of the die cells so as to be engageable with a radially outer portion of a given extrusion of hay emerging therefrom. As a break-off tab so engages an extrusion of compacted or compressed hay, the latter is caused to bend and break substantially at the exit end of its associated die cell to form a wafer which then drops onto the bottom wall 52 of the housing 46 and is conveyed therealong by the associated conveyor paddle. As will be appreciated, the gear reduction between the drive shaft 50 and the conveyor mechanism aforedescribed and, hence, the timing of the latter is such as to permit a predetermined length of extruded hay to overhang from the exit ends of the die cells before being engaged by a break-off tab 94.

The hay wafers which fall upon the bottom wall 52 of the housing 46 are moved therealong as aforedescribed until reaching an opening or the like therein, not shown, communicating with one end of an elevator-type conveyor 96 of conventional construction equipped with spaced conveyor paddles 98 which pick up the hay wafers and convey them from the apparatus, preferably into a trailing conveyance.

The embodiments of the invention in which an exclusive property or privilege is claimed are defined as follows:

1. A method of wafering hay comprising the steps of delivering hay in an accompanying air stream to one end of a feed hopper axially spaced from a feed auger therein and parallel to the axes of the latter, separating the air stream from the hay within the hopper and venting the air stream from the hopper through said one end thereof, feeding the hay from the hopper along the feed auger and laying it upon the entrance ends of an annular series of axially open die cells, applying force successively to hay opposite the entrance ends of the die cells to compact the hay into and therethrough to form an extrusion of compacted hay emerging from the exit ends thereof, and breaking the extrusions emerging from the exit ends of the die cells into wafers.

2. In an apparatus for making compressed hay wafers, and of the type having an annular series of die cells including entrance ends thereof circumferentially spaced about and communicating with a wafering chamber in which there is mounted a rotary hay compaction means for compacting hay received within said chamber into and through said die cells to form wafers; the improvement comprising a hopper having one end thereof communicating with said chamber, feed auger means mounted within said hopper, the other end of said hopper extending axially beyond said feed auger means, means for delivering hay to be wafered in an accompanying air stream into the other end of said hopper spaced from said feed auger means, and vent means for venting the air stream from the hopper through said other end thereof.

3. The apparatus according to claim 2 in which said other end of said hopper is open to atmosphere, and wherein said means for delivering hay to be wafered in an accompanying air stream includes chute means radially spaced within said other end of said hopper, the radial space between said chute means and said other end of said hopper forming said vent means.

4. In an apparatus for making compressed hay wafers, and of the type having an annular series of die cells including entrance ends thereof circumferentially spaced about and communicating with a wafering chamber in which there is mounted a rotary hay compaction means for compacting hay received within said chamber into and through said die cells to form wafers; the improvement comprising an axially open and extending hopper having one open end thereof communicating with said chamber and the other open end thereof spaced therefrom, axially extending rotatable feed auger means mounted within said hopper and having one end thereof drivingly connected to said rotary hay compaction means for rotation with the latter and the other end thereof spaced axially therefrom and terminating axially between said ends of said hopper, means for delivering hay to be wafered in an accompanying air stream through said other end of said hopper into the latter and axially upon said other end of said feed auger means, and vent means for venting the air stream from said hopper through said other end thereof.

5. The apparatus according to claim 4 in which said feed auger means includes a plurality of auger flights tapering axially inwardly from said one end thereof toward said other end thereof.

6. The apparatus according to claim 4 in which said hopper includes an annular throat portion intermediate the open ends thereof and tapers axially inwardly from said one open end thereof to said throat portion, and in which said feed auger means includes a plurality of auger flights tapering axially inwardly from said one end thereof toward said other end thereof in radially spaced relation to said hopper between said one open end and throat portion thereof.

7. The apparatus according to claim 4 in which said hopper includes an annular throat portion intermediate the open ends thereof and tapers axially inwardly from said one open end thereof to said throat portion and axially outwardly from the latter to said other open end thereof, and wherein said means for delivering hay to be wafered in an accompanying air stream includes chute means radially spaced within said other open end of said hopper and substantially axially aligned with said throat portion thereof and said other end of said feed auger means, the radial space between said chute means and said other open end of said hopper forming said vent means.

8. The apparatus according to claim 7 in which said feed auger means includes a plurality of auger flights tapering axially inwardly from said one end thereof toward said other end thereof in radially spaced relation to said hopper between said one open end and throat portion thereof.

9. In an apparatus for making compressed hay wafers, and of the type having an annular series of die cells including entrance ends thereof circumferentially spaced about and communicating with a wafering chamber in which there is mounted a rotary hay compaction means for compacting hay received within said chamber into and through said die cells to form wafers; the improvement comprising a hopper having one end thereof communicating with said chamber, axially extending rotatable feed auger means mounted within said hopper and having one end thereof drivingly connected to said rotary hay compaction means for rotation with the latter, said feed auger means including a plurality of auger flights tapering axially inwardly from said one end thereof toward the other end thereof, said hopper including an annular throat portion radially spaced from and surrounding said other end of said feed auger means and tapering axially inwardly from said one end thereof to said throat portion, and means for delivering hay to be wafered into said hopper axially about said other end of said feed auger means for feed to said chamber.

References Cited by the Examiner
UNITED STATES PATENTS

| | | |
|---|---|---|
| 858,352 | 6/07 | Sharpneck. |
| 1,238,981 | 9/17 | Barton. |
| 1,484,179 | 2/24 | McClure et al. |
| 2,947,129 | 8/60 | Kowalik _____ 56—24 X |
| 3,087,294 | 4/63 | Kessler _____ 56—24 |

FOREIGN PATENTS

| | | |
|---|---|---|
| 18,233/24 | 6/24 | Australia. |
| 1,250,174 | 11/60 | France. |
| 196,947 | 5/23 | Great Britain. |
| 505,231 | 5/39 | Great Britain. |

OTHER REFERENCES

Western Livestock Journal, April 1961, pages 36 and 39.

Agricultural Engineering, S. 671.A3, August 1961, pages 412–415 and 423.

WALTER A. SCHEEL, *Primary Examiner.*

UNITED STATES PATENT OFFICE
CERTIFICATE OF CORRECTION

Patent No. 3,183,857 May 18, 1965

Stanley L. Lawrence

It is hereby certified that error appears in the above numbered patent requiring correction and that the said Letters Patent should read as corrected below.

Column 2, line 35, for "communicates" read -- communicating --; column 3, line 38, for "froming" read -- forming --; line 41, for "know" read -- known --; column 4, lines 37 to 42, strike out "For a more detailed description of such construction, reference may be made to copending application Serial No. 194,399, filed May 14, 1962 in the name of Merle H. Peterson and Stanley L. Lawrence, entitled "Hay Wafering Method and Apparatus," and assigned to the assignee of this application." and insert the same, after "purposes." in line 71; same column 4, line 44, for "directed" read -- directly --.

Signed and sealed this 12th day of October 1965.

(SEAL)
Attest:

ERNEST W. SWIDER
Attesting Officer

EDWARD J. BRENNER
Commissioner of Patents